United States Statutory Invention Registration [19]

[11] Reg. Number: H783

Callender

[43] Published: Jun. 5, 1990

[54] TELESCOPE WITH IMPROVED MIRROR SUPPORT

[75] Inventor: Alan B. Callender, Stuart, Fla.

[73] Assignee: The United States of America as represented by the Secretary of the Army, Washington, D.C.

[21] Appl. No.: 456,898

[22] Filed: Dec. 26, 1989

[51] Int. Cl.[5] ..... G02B 5/10

[52] U.S. Cl. ..... 350/620; 350/618; 350/619

*Primary Examiner*—Thomas H. Tarcza
*Assistant Examiner*—Linda J. Wallace
*Attorney, Agent, or Firm*—Freddie M. Bush; Robert L. Broad

[57] ABSTRACT

A Cassegrain telescope having a primary mirror having an aperture centered on the axis thereof and a secondary mirror spaced from the primary mirror and centered on the axis of the primary mirror for receiving reflected light from the primary mirror and reflecting it through the aperture in the primary mirror and a support member extending from the primary mirror support structure to the secondary mirror. The support member is in the form of a conical honeycomb having cells extending in a direction parallel to the axis of the primary mirror. The support member is made from a carbonized polymeric material.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TELESCOPE WITH IMPROVED MIRROR SUPPORT

DEDICATORY CLAUSE

The invention described herein may be manufactured, used and licensed by or for the Government for governmental purposes without the payment to me of any royalties thereon.

BACKGROUND OF THE INVENTION

1. Field of the Invention

This invention relates to supports for telescope mirrors.

2. Prior Art

In present practice the secondary mirror in a Cassegrain telescope is held in place by the use of large, hollow beams arranged to form a three or four legged spider. These beams are high in mass and obscure a significant amount of light which would otherwise fall on the primary mirror. A Cassegrain telescope presents severe optical baffling and secondary mirror support requirements, especially in moderate to narrow field-of-view designs with small focal ratios and the use of large support beams makes matters worse.

Optical baffling is also a severe problem with this type of telescope. Some designs use a cylindrical baffle which extends from the primary mirror in a direction parallel to the axis of the primary mirror to a point beyond the secondary mirror. This cylindrical baffle is difficult to support and adds weight to the system.

SUMMARY OF THE INVENTION

A Cassegrain telescope having a primary mirror having an aperture centered on the axis thereof and a secondary mirror spaced from the primary mirror and centered on the axis of the primary mirror for receiving reflected light from the primary mirror and reflecting it through the aperture in the primary mirror. A support member extends from the primary mirror support structure to the secondary mirror, the support member being in the form of a conical honeycomb having cells extending in a direction parallel to the axis of the primary mirror. The support member is made from a carbonized polymeric material.

DETAILED DESCRIPTION OF THE INVENTION

Figure 1:
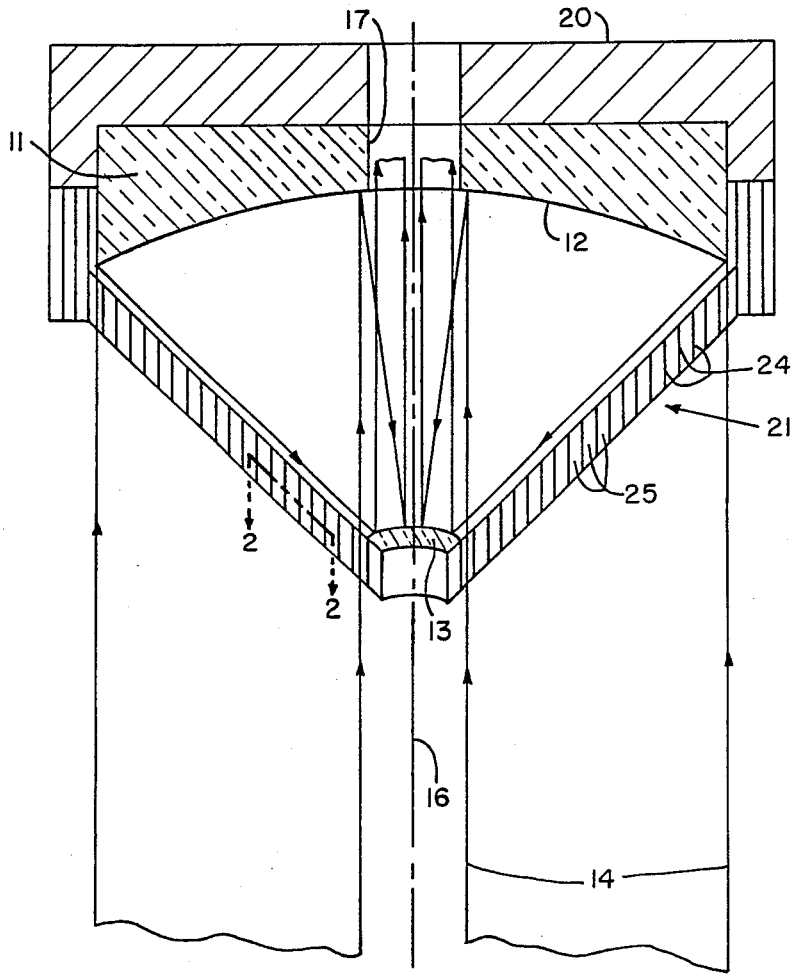
FIG. 1 is a cross sectional view showing the conical configuration of the secondary mirror support of this invention.
Figure 2:
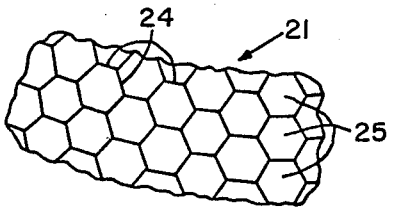
FIG. 2 is a fragmentary cross sectional view taken along line 2—2 of FIG. 1 showing the honeycomb structure of the mirror support.

Referring now in detail to the drawing, there is shown a Cassegrain telescope having a primary mirror 11 having a concave surface 12 which collects light, represented by rays 14 in FIG. 1, from a distant source and reflects this light to a secondary mirror 13 having a convex surface of a known type. The secondary mirror is centered on the axis 16 of the primary mirror and is spaced from the primary mirror 11 to reflect light from the surface 12 through a central aperture 17 in the primary mirror 11, this central aperture 17 being centered on the axis 16 of the primary mirror. reflected light from the secondary mirror forms an image at a point behind the primary mirror in a well known manner.

The primary mirror 11 is supported by a structure 20, shown schematically in FIG. 1, of a type which is well known. The structure 20 can be moved in a known manner to aim the telescope at whatever object is to be observed.

The secondary mirror 13 is attached to and supported in the position shown by a conical support member 21 which is secured to and carried by the primary mirror support structure 20. The support member 21 is made up of walls 24 which form cells 25 which extend in a direction parallel to the axis of the primary mirror 11.

When the primary mirror is about three meters in diameter and the secondary mirror is spaced about five meters from the primary mirror, the cells 25 should have a length of about 10 centimeters. The cell size, from one wall to the wall on the other side of the cell may be, for a narrow field of view, as small as one millimeter. Of course, the cell size may be larger, depending on the load that the support member 21 must carry. The cell wall thickness may be as small as a fraction of a millimeter.

The honeycomb support member 21 is made from a carbonized polymeric material which is preferably filled with chopped glass fibers for added strength. The support member 21 may be made by providing a form or mold of suitable configuration and then pouring a polymeric material such as polyester or epoxy resin containing glass fibers into the mold. The resin is then cured in a well known manner to solidify the resin. The solidified resin is then removed from the mold and placed in an oven and heated to carbonize the resin. This is a known process.

Light from a distant object being observed will enter the telescope along paths parallel to the axis of the primary mirror and will thus pass unobstructed, except for the cross sectional area of the support member, through the support member 21 to strike the primary mirror 11. Light entering the telescope at other angles will strike the walls 24 of the support member 21 and be reflected back and forth from wall to wall in passing through the cells. This will absorb and thus baffle this light. Also, the fact that the support member is made from a carbonized polymeric material assures that ay off-axis light will be better absorbed, since the carbonized material of the member 21 will be very black.

The cross sectional size and length of the cells and the polymeric material from which the support member is made are selected to provide the desired mix of stiffness, lower frequency cutoff in the diffraction pattern created by the support member, acceptable vignetting, acceptable mass and on-axis obscuration.

What is claimed is:

1. A telescope, comprising a. a primary mirror having a central axis and a central aperture centered on said axis, b. a secondary mirror spaced from and positioned on the axis of the primary mirror to receive reflected light from the primary mirror and reflect it through the central aperture in the primary mirror, c. means for supporting the primary mirror, and d. a conical support member attached to the primary mirror support means for supporting the secondary mirror, said conical member being in the form of a honeycomb having therein openings extending in a direction parallel to said axis.

2. The device of claim 1 wherein the openings are hexagonal in cross section.

3. The device of claim 3 wherein the conical support is made from a carbonized polymeric material.

4. The device of claim 3 wherein the polymeric material is a polyester resin.

5. The device of claim 3 wherein the polymeric material is an epoxy resin.

* * * * *